US012620740B2

(12) United States Patent
Ashibu

(10) Patent No.: US 12,620,740 B2
(45) Date of Patent: May 5, 2026

(54) CONNECTOR CONNECTING AN ELECTRIC WIRE TO A SUBSTRATE

(71) Applicant: Japan Aviation Electronics Industry, Limited, Tokyo (JP)

(72) Inventor: Kenta Ashibu, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 311 days.

(21) Appl. No.: 18/355,712

(22) Filed: Jul. 20, 2023

(65) Prior Publication Data

US 2024/0106143 A1 Mar. 28, 2024

(30) Foreign Application Priority Data

Sep. 26, 2022 (JP) ................................ 2022-152679

(51) Int. Cl.
*H01R 12/75* (2011.01)
*H01R 12/81* (2011.01)
*H01R 13/629* (2006.01)

(52) U.S. Cl.
CPC ............. *H01R 12/75* (2013.01); *H01R 12/81* (2013.01); *H01R 13/629* (2013.01)

(58) Field of Classification Search
CPC ...... H01R 12/61; H01R 12/65; H01R 12/716; H01R 12/75; H01R 12/81; H01R 13/629
See application file for complete search history.

(56) References Cited

U.S. PATENT DOCUMENTS 4,352,535 A * 10/1982 McNamee, Sr. ....... H01R 13/26 439/345
6,217,374 B1 * 4/2001 O'Sullivan ............ H01R 12/78 439/494
2002/0160642 A1 * 10/2002 Bach ...................... H01R 12/61 439/329
2007/0087607 A1 * 4/2007 Nagano .............. H01R 13/5213 439/288

FOREIGN PATENT DOCUMENTS

JP 2007-214087 A 8/2007

* cited by examiner

*Primary Examiner* — Abdullah A Riyami
*Assistant Examiner* — Thang H Nguyen
(74) *Attorney, Agent, or Firm* — MUNCY, GEISSLER, OLDS & LOWE, P.C.

(57) ABSTRACT

A connector includes a first insulator having a recess portion, a second insulator having a protrusion portion, and a contact, the contact including a mounting portion mounted on a substrate, a first retained portion retained by the first insulator, a second retained portion retained by the second insulator, a deformable joint portion, and a connection portion connected to a conductive portion of the substrate, the first retained portion including a recessed bent portion accommodated in the recess portion, the first insulator and the second insulator being fitted to each other such that a conductor portion of an electric wire is sandwiched between the recessed bent portion of the first retained portion and the protrusion portion of the second insulator, the conductor portion of the electric wire making contact with the recessed bent portion to be electrically connected to the conductive portion of the substrate via the contact.

11 Claims, 9 Drawing Sheets

CONNECTOR CONNECTING AN ELECTRIC WIRE TO A SUBSTRATE

BACKGROUND OF THE INVENTION

The present invention relates to a connector, particularly to a connector connecting a conductor portion of an electric wire to a conductive portion exposed on a surface of a substrate.

In recent years, attention has been drawn to so-called smart clothes that can obtain user's biological data such as the heart rate and the body temperature only by being worn by the user. Such smart clothes have an electrode disposed at a measurement site and constituted of a flexible conductor, and when a wearable device serving as a measurement device is electrically connected to the electrode, biological data can be transmitted to the wearable device.

The electrode and the wearable device can be interconnected by, for instance, use of a connector connected to the flexible conductor.

However, when the wearable device is situated away from the measurement site, it is necessary to provide an electric circuit connecting the electrode disposed at the measurement site to the place where the connector is attached, and if such an electric circuit is formed from a flexible conductor, this causes higher electric resistance and higher cost.

To connect an electrode constituted of a flexible conductor to a wearable device by use of an electric wire that has low electric resistance and is inexpensive, it has been desired to develop a small-sized connector connecting the electric wire to the flexible conductor disposed on a garment.

For instance, JP 2007-214087 A discloses a connector shown in FIG. 21 as a connector used for connecting an electric wire to a flexible conductor. This connector includes a first connector 2 connected to an end of a substrate 1 and a second connector 4 attached to tips of electric wires 3, and the electric wires 3 can be connected to a flexible conductor of the substrate 1 by fitting the second connector 4 to the first connector 2.

However, the first connector 2 and the second connector 4 that are separately attached to the end of the substrate 1 and the tips of the electric wires 3 need to be fitted to each other in order to connect the electric wires 3 to the flexible conductor of the substrate 1, and this causes a larger size of a device; and there is a separatable connection portion between the first connector 2 and the second connector 4, which impairs the reliability of electric connection.

SUMMARY OF THE INVENTION

The present invention has been made to overcome the conventional problems as above and aims at providing a connector that can have a small size while reliably connecting a conductor portion of an electric wire to a conductive portion exposed on a surface of a substrate.

A connector according to the present invention is one connecting a conductor portion of an electric wire to a conductive portion exposed on a surface of a substrate, the connector comprising:

- a first insulator disposed on the surface of the substrate and having a recess portion;
- a second insulator disposed to be able to be fitted to the first insulator and having a protrusion portion corresponding to the recess portion; and
- a contact having conductivity and retained by both the first insulator and the second insulator, the contact including:

- a mounting portion situated at one end of the contact and mounted on the substrate;
- a first retained portion situated to be adjacent to the mounting portion and retained by the first insulator;
- a second retained portion situated at the other end of the contact and retained by the second insulator;
- a joint portion joining together the first retained portion and the second retained portion and being deformable; and
- a connection portion electrically connected to the conductive portion of the substrate, wherein the first retained portion includes a recessed bent portion that is accommodated in the recess portion and extends along an inner surface of the recess portion, the first insulator and the second insulator are fitted to each other such that the conductor portion of the electric wire is sandwiched between the recessed bent portion of the contact and the protrusion portion of the second insulator, and the conductor portion of the electric wire makes contact with the recessed bent portion between the recess portion and the protrusion portion, whereby the conductor portion of the electric wire is electrically connected to the conductive portion of the substrate via the contact.

DETAILED DESCRIPTION OF THE INVENTION

Embodiments of the present invention are described below based on the accompanying drawings.

Embodiment 1

Figure 1:
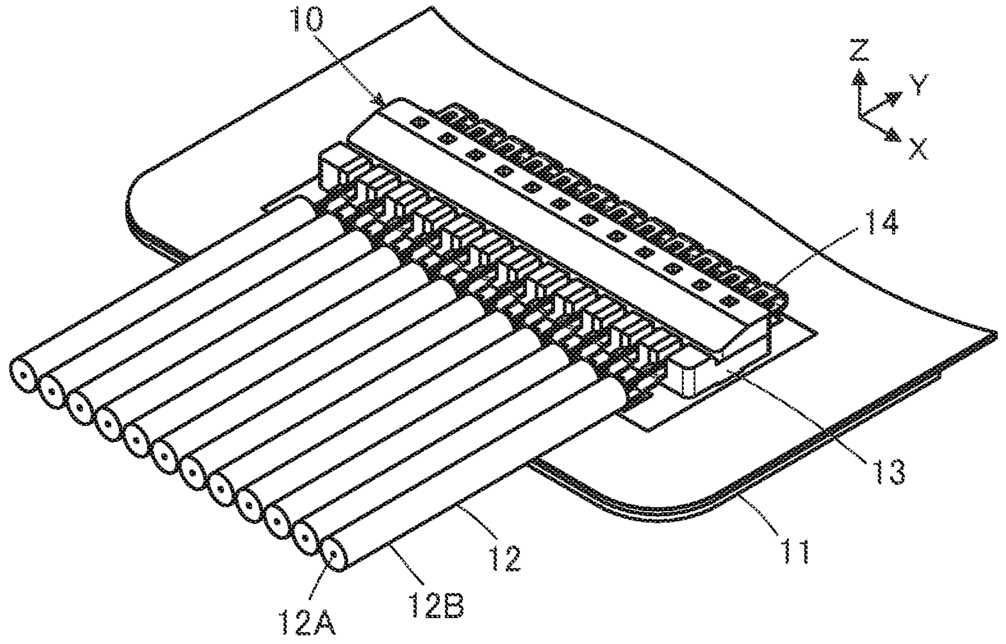
FIG. 1 is a perspective view showing a connector according to Embodiment 1 which is mounted on a substrate and to which a plurality of coated electric wires are connected.

FIG. 1 shows a connector 10 according to Embodiment 1. The connector 10 is used for connecting a plurality of coated electric wires 12 to a substrate 11 and includes a housing 13 made of an insulating resin material and a plurality of contacts 14 retained by the housing 13.

The substrate 11 is constituted of a sheet type conductive member, and the connector 10 is mounted on a surface of the substrate 11.

The coated electric wires 12 are aligned in a predetermined alignment direction and each extend in a direction perpendicular to the alignment direction in parallel to the surface of the substrate 11. Each coated electric wire 12 has a structure in which the outer periphery of a conductor portion 12A is covered with an insulating coating portion 12B. With the use of the connector 10 according to Embodiment 1, the conductor portions 12A of the plurality of coated electric wires 12 are electrically connected to a plurality of conductive portions to be described later of the substrate 11. The conductor portion 12A of the coated electric wire 12 may be either a so-called solid wire constituted of one conductor or a so-called stranded wire constituted of plural conductors being stranded.

The housing 13 extends along the alignment direction of the coated electric wires 12.

For convenience, the substrate 11 is defined as extending along an XY plane, the alignment direction of the coated electric wires 12 is referred to as "X direction," the direction in which each coated electric wire 12 extends toward the housing 13 is referred to as "+Y direction," and the direction perpendicular to an XY plane is referred to as "Z direction."

As shown in FIGS. 2 to 6, the housing 13 is composed of a first insulator 15 and a second insulator 16 each of which extends in the X direction and which are separate from each other. The contacts 14 extending in the Y direction and aligned in the X direction with an alignment pitch P1 are retained by the first insulator 15 and the second insulator 16, and the first insulator 15 and the second insulator 16 are joined together via the contacts 14 with distance from each other in the Y direction.

The first insulator 15 has a first flat surface 15A facing the +Z direction and extending in an XY plane. The first flat surface 15A is provided with a plurality of electric wire insertion grooves 15B aligned in the X direction to correspond to the contacts 14 and each traversing the first insulator 15 in the Y direction, and each electric wire insertion groove 15B is provided at its intermediate portion with a recess portion 15C recessed from the bottom of the electric wire insertion groove 15B toward the −Z direction. The recess portions 15C of the electric wire insertion grooves 15B are joined together in the X direction to form a fitting groove 15D extending in the X direction over the entire X directional width of the first insulator 15.

The bottom surface, facing the −Z direction, of the first insulator 15 is provided with a projection portion 15E extending in the X direction over the entire X directional width of the first insulator 15 and projecting in the −Z direction.

The second insulator 16 has a second flat surface 16A facing the +Z direction and extending in an XY plane in the state where the contacts 14 each linearly extend in the Y direction such that the first and second insulators 15 and 16 are developed, as shown in FIGS. 2 to 6. The second flat surface 16A is provided with a fitting portion 16B extending in the X direction over the entire X directional width of the second insulator 16 and projecting in the +Z direction, and the fitting portion 16B is provided with a plurality of protrusion portions 16C aligned in the X direction to correspond to the contacts 14 and to be accommodated in the corresponding recess portions 15C of the first insulator 15.

The first insulator 15 and the second insulator 16 are configured such that, by deforming the contacts 14 to insert the fitting portion 16B of the second insulator 16 into the fitting groove 15D of the first insulator 15, the first insulator 15 and the second insulator 16 are fitted to each other and the second flat surface 16A makes contact with the first flat surface 15A.

Figure 7:
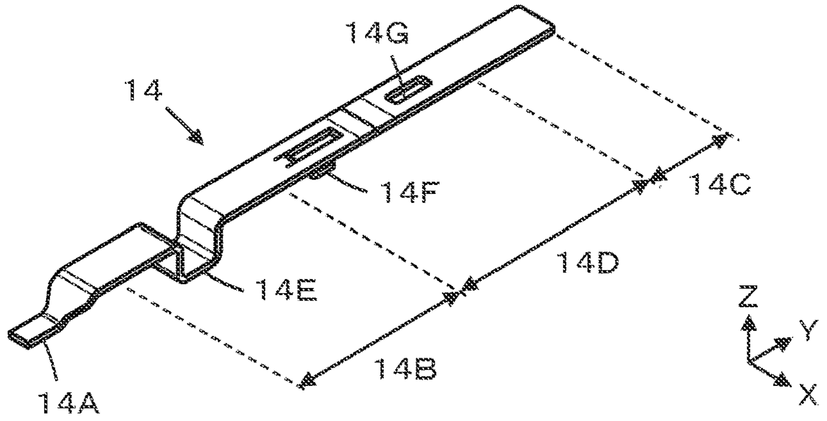
FIG. 7 is a perspective view showing a contact used in the connector according to Embodiment 1.

As shown in FIG. 7, the contact 14 is formed from a band shaped metal sheet substantially extending in the Y direction and having conductivity. A mounting portion 14A to be mounted on the substrate 11 is disposed at the −Y directional end of the contact 14, and a first retained portion 14B to be retained by the first insulator 15 is disposed on the +Y direction side of the mounting portion 14A to be adjacent to the mounting portion 14A. A second retained portion 14C to be retained by the second insulator 16 is disposed at the +Y directional end of the contact 14, and a joint portion 14D joining together the first retained portion 14B and the second retained portion 14C is disposed between the first retained portion 14B and the second retained portion 14C.

The first retained portion 14B is provided at its intermediate portion with a recessed bent portion 14E that is bent to be dented in the −Z direction.

The joint portion 14D is formed to be deformable so as to be curved in the thickness direction of the contact 14; when the connector 10 is assembled, the joint portion 14D is deformed into a U-shape opening toward the −Y direction such that the second retained portion 14C is situated on the +Z direction side of the first retained portion 14B.

The joint portion 14D is provided at its intermediate portion with a connection portion 14F and an inspection hole 14G. The connection portion 14F is formed to project in the −Z direction by lancing the metal plate constituting the contact 14, and the inspection hole 14G is situated on the +Y direction side of the connection portion 14F and penetrates the metal plate constituting the contact 14 in the thickness direction of the contact 14.

Figure 8:
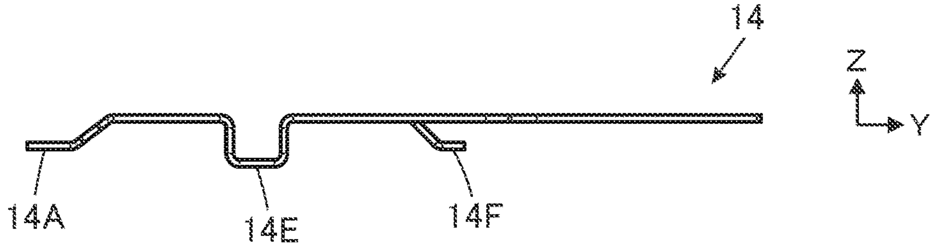
FIG. 8 is a side view showing the contact used in the connector according to Embodiment 1.

As shown in FIG. 8, the mounting portion 14A and the connection portion 14F extend in an XY plane in the same Z directional position, and the bottom of the recessed bent portion 14E is situated on the −Z direction side with respect to the Z directional position of the mounting portion 14A and the connection portion 14F. When the first retained portion 14B of the contact 14 is retained by the first insulator 15, the bottom of the recessed bent portion 14E is disposed within the projection portion 15E of the first insulator 15.

The connector 10 having the thus-configured contacts 14 and the first and second insulators 15 and 16 that are integrally formed is fabricated by, for instance, insert molding.

Figure 2:
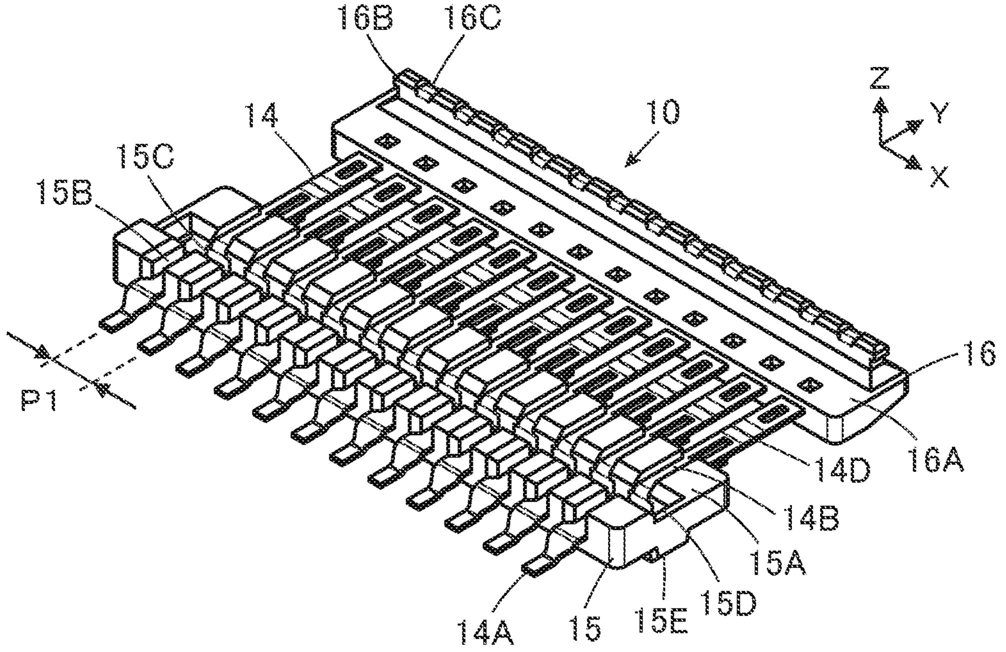
FIG. 2 is a perspective view showing the connector according to Embodiment 1 with a first insulator and a second insulator being developed.

As shown in FIG. 2, the mounting portions 14A situated at the −Y directional ends of the contacts 14 are exposed from the first insulator 15 to project in the −Y direction, and the second retained portions 14C situated at the +Y directional ends of the contacts 14 are embedded in the second insulator 16 such that the second retained portions 14C are not visible from the outside. The joint portions 14D of the contacts 14 are exposed between the first insulator 15 and the second insulator 16, and middle portions, in the X direction, of the first retained portions 14B are exposed in the corresponding electric wire insertion grooves 15B of the first insulator 15.

Although not shown in FIG. 2, the recessed bent portions 14E of the contacts 14 are accommodated in the recess portions 15C formed in the intermediate portions of the electric wire insertion grooves 15B such that the inner surfaces of the recessed bent portions 14E are exposed.

Figure 3:
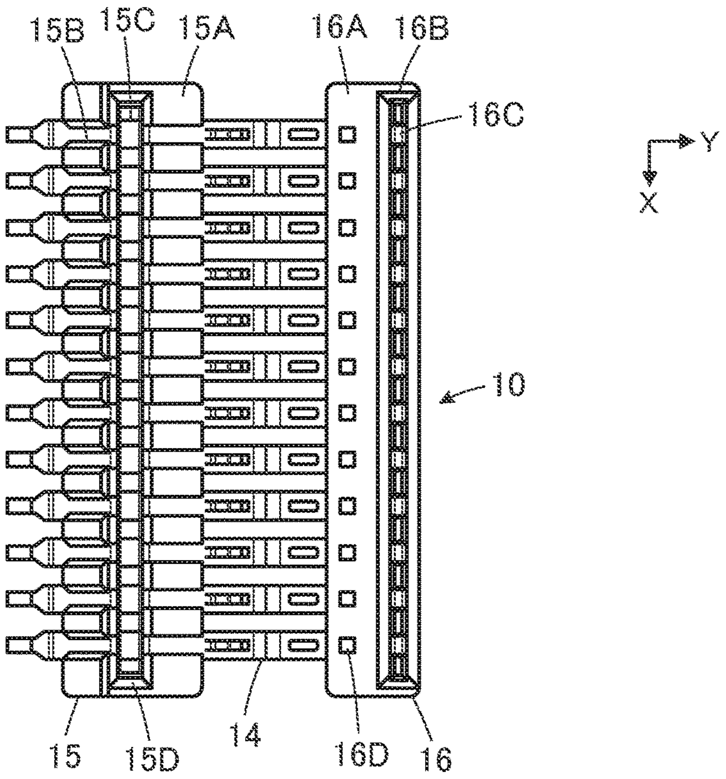
FIG. 3 is a plan view showing the connector according to Embodiment 1 with the first insulator and the second insulator being developed.
Figure 4:
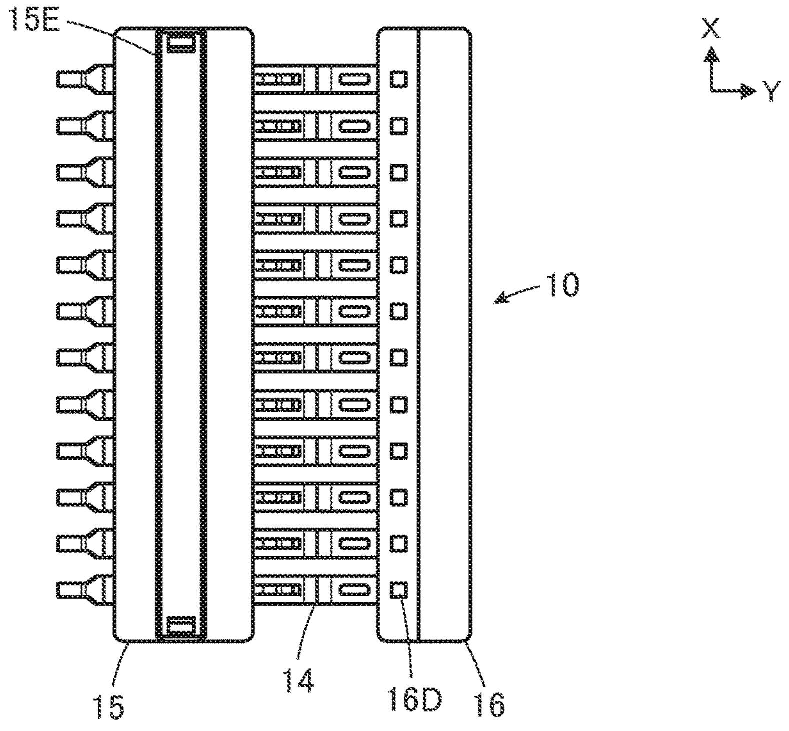
FIG. 4 is a bottom view showing the connector according to Embodiment 1 with the first insulator and the second insulator being developed.
Figure 5:
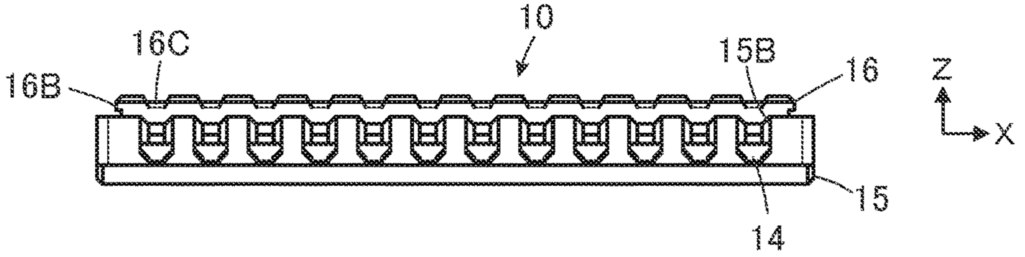
FIG. 5 is a front view showing the connector according to Embodiment 1 with the first insulator and the second insulator being developed.
Figure 6:
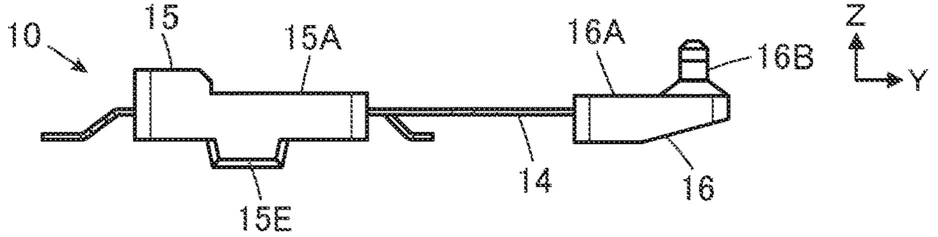
FIG. 6 is a side view showing the connector according to Embodiment 1 with the first insulator and the second insulator being developed.

In insert molding, it is necessary to inject resin with the +Y directional ends of the contacts 14 to be embedded in the second insulator 16 being held from the top and bottom by use of holding pins or other means in a molding die, so that a plurality of insertion holes 16D corresponding to the contacts 14 are formed in the second insulator 16 as a trace of removal of such holding pins or the like after molding as shown in FIGS. 3 and 4.

Figure 9:
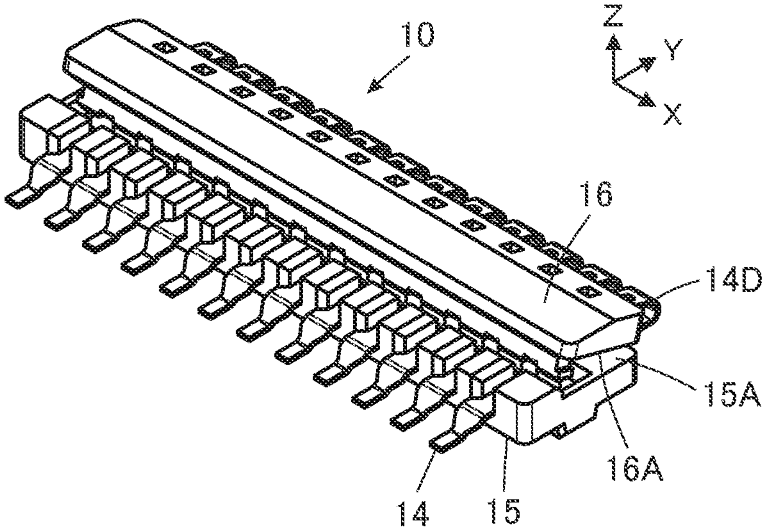
FIG. 9 is a perspective view showing the connector according to Embodiment 1 before being assembled.

As shown in FIG. 9, the joint portions 14D of the contacts 14 are deformed into a U-shape and folded back toward the −Y direction while the second insulator 16 is brought up toward the +Z direction with respect to the first insulator 15, thereby having the connector 10 in a pre-assembly state where the second flat surface 16A of the second insulator 16 obliquely faces the first flat surface 15A of the first insulator 15.

Figure 10:
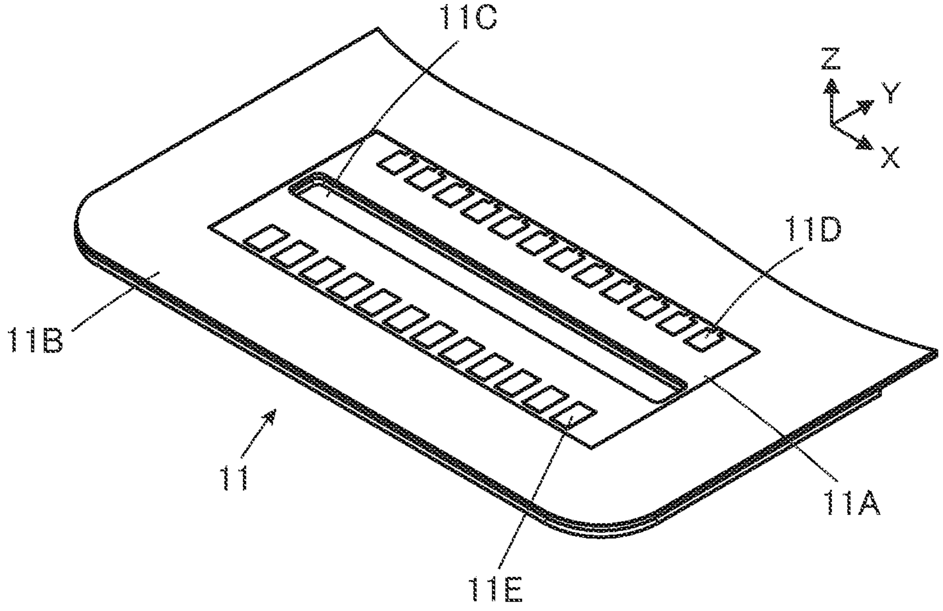
FIG. 10 is a perspective view showing the substrate.

FIG. 10 shows the substrate 11 on which the connector 10 is to be mounted. The substrate 11 is, for instance, constituted of a sheet type conductive member having a multilayer structure in which a plurality of wiring layers each formed from a conductor and a plurality of insulating layers are laminated, and a connector mounting region 11A of rectangular shape is formed on a surface of the substrate 11 on the +Z direction side. The connector mounting region 11A is formed by peeling off, in a rectangular shape, an insulating layer 11B disposed at the surface of the substrate 11 on the +Z direction side, and a depression 11C extending in the X direction is formed in a central portion of the connector mounting region 11A. More specifically, the depression 11C is formed from a through-hole penetrating the substrate 11 in the Z direction.

The depression 11C has a size allowing the projection portion 15E projecting in the −Z direction from the bottom surface of the first insulator 15 to fit therein.

The inside of the connector mounting region 11A is provided with a plurality of conductive portions 11D aligned in the X direction on the +Y direction side of the depression 11C to correspond to the contacts 14 of the connector 10. The conductive portions 11D are formed from part of one wiring layer of the substrate 11 and connected to a plurality of wiring portions (not shown) covered with the insulating layer 11B.

Meanwhile, a plurality of fixing portions 11E aligned in the X direction to correspond to the contacts 14 of the connector 10 are formed on the −Y direction side of the depression 11C in the connector mounting region 11A. While the fixing portions 11E can be formed from part of one wiring layer of the substrate 11 as with the conductive portions 11D, the fixing portions 11E are disposed only in the connector mounting region 11A without being connected to a plurality of wiring portions (not shown).

The conductive portions 11D and the fixing portions 11E are separately aligned in the X direction with the same pitch as the alignment pitch P1 of the contacts 14. The distance between the depression 11C and the conductive portions 11D in the Y direction is substantially the same as the distance between the projection portion 15E of the first insulator 15 and the connection portions 14F of the contacts 14 of the connector 10 in the Y direction, and the distance between the depression 11C and the fixing portions 11E in the Y direction is substantially the same as the distance between the projection portion 15E of the first insulator 15 and the mounting portions 14A of the contacts 14 of the connector 10 in the Y direction.

Figure 11:
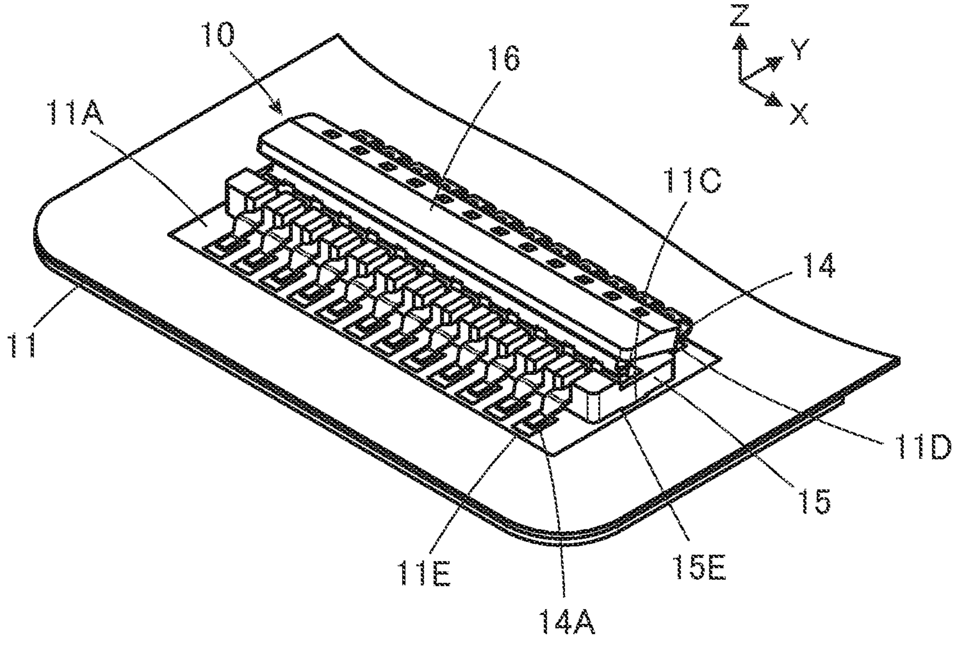
FIG. 11 is a perspective view showing the connector according to Embodiment 1 mounted on the substrate.

Accordingly, when the projection portion 15E of the first insulator 15 of the connector 10 is fitted in the depression 11C of the substrate 11 as shown in FIG. 11, the connection portions 14F of the contacts 14 are situated on the conductive portions 11D of the substrate 11, and the mounting portions 14A of the contacts 14 are situated on the fixing portions 11E of the substrate 11.

In this state, the connection portions 14F and the mounting portions 14A of the contacts 14 are respectively connected to the conductive portions 11D and the fixing portions 11E of the substrate 11 by soldering or other methods, whereby the connector 10 is mounted on the substrate 11.

Figure 12:
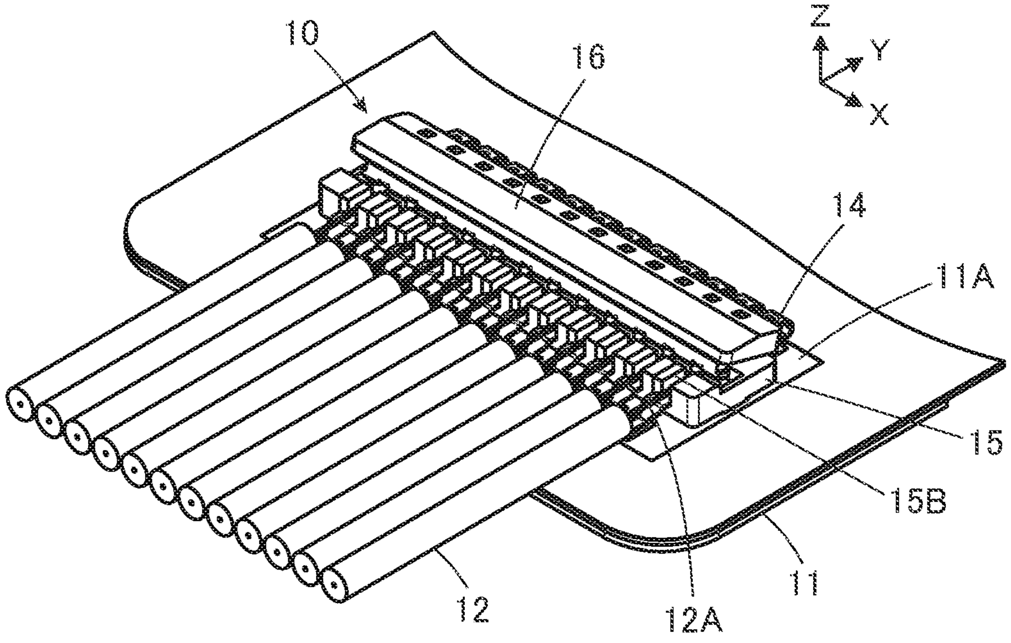
FIG. 12 is a perspective view showing the connector according to Embodiment 1 which is mounted on the substrate and in which the plurality of coated electric wires are disposed.

When the connector 10 is assembled, first, the coated electric wires 12 are aligned in the X direction, and the conductor portions 12A drawn from the coated electric wires 12 are inserted into the first insulator 15 of the connector 10 from the −Y direction, as shown in FIG. 12.

Figure 13:
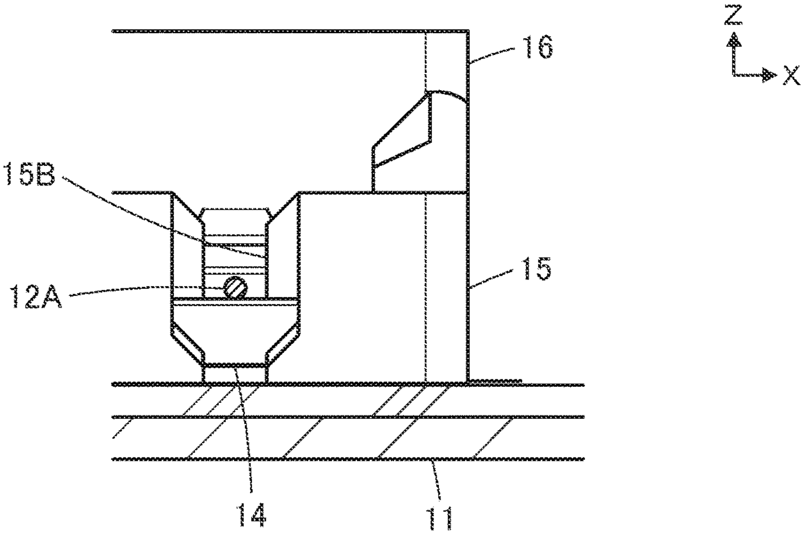
FIG. 13 is a partial front view showing the connector according to Embodiment 1 which is mounted on the substrate and in which a conductor portion of a coated electric wire is inserted.
Figure 14:
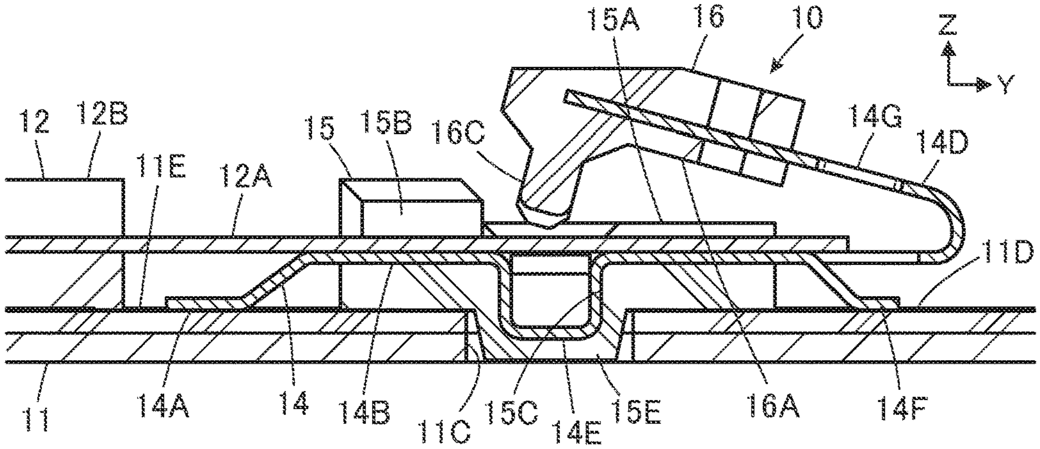
FIG. 14 is a partial, cross-sectional side view showing the connector according to Embodiment 1 immediately before being assembled.

At this time, each conductor portion 12A is inserted into the corresponding electric wire insertion groove 15B of the first insulator 15 as shown in FIG. 13. Since the first retained portion 14B of the contact 14 is exposed in the electric wire insertion groove 15B, the conductor portion 12A is disposed on a surface of the first retained portion 14B of the contact 14 as shown in FIG. 14. The conductor portion 12A is inserted into the electric wire insertion groove 15B until the +Y directional end of the conductor portion 12A protrudes on the +Y direction side of the first insulator 15 and reaches a position near the connection portion 14F of the contact 14 on the +Z direction side of the contact 14.

Figure 15:
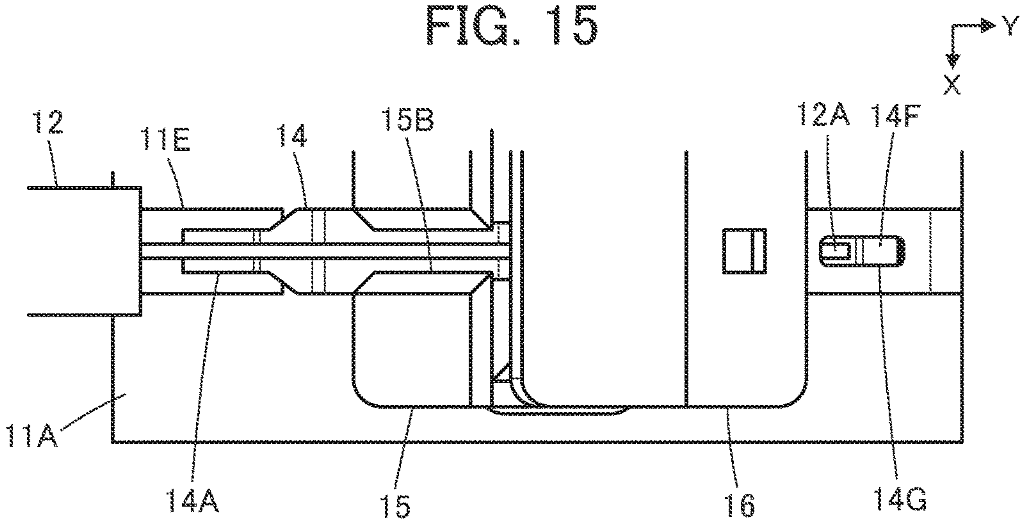
FIG. 15 is a partial plan view showing the connector according to Embodiment 1 immediately before being assembled.

The inspection hole 14G formed in the joint portion 14D of the contact 14 is situated on the +Z direction side of the connection portion 14F in the connector 10 in the pre-assembly state where the joint portion 14D of the contact 14 is deformed in a U-shape such that the second flat surface 16A of the second insulator 16 obliquely faces the first flat surface 15A of the first insulator 15. Thus, it is possible to visually check the +Y directional end of the conductor portion 12A through the inspection hole 14G from the +Z direction side of the connector 10, as shown in FIG. 15. In other words, an operator carrying out the connecting operation of the coated electric wires 12 can visually check that the +Y directional ends of the conductor portions 12A protrude on the +Y direction side of the first insulator 15 by a predetermined length through the inspection holes 14G of the contacts 14.

When the insertion length of the conductor portion 12A of the coated electric wire 12 is excessively small with respect to the electric wire insertion groove 15B of the first insulator 15, the reliability of electric connection between the conductor portion 12A and the contact 14 may decrease; when the insertion length of the conductor portion 12A is excessively large, one conductor portion 12A may be short-circuited with a contact 14 corresponding to an adjacent conductor portion 12A. Thus, the reliability of connection of the coated electric wires 12 can be improved by checking the +Y directional ends of the conductor portions 12A inserted up to the proper positions.

Figure 16:
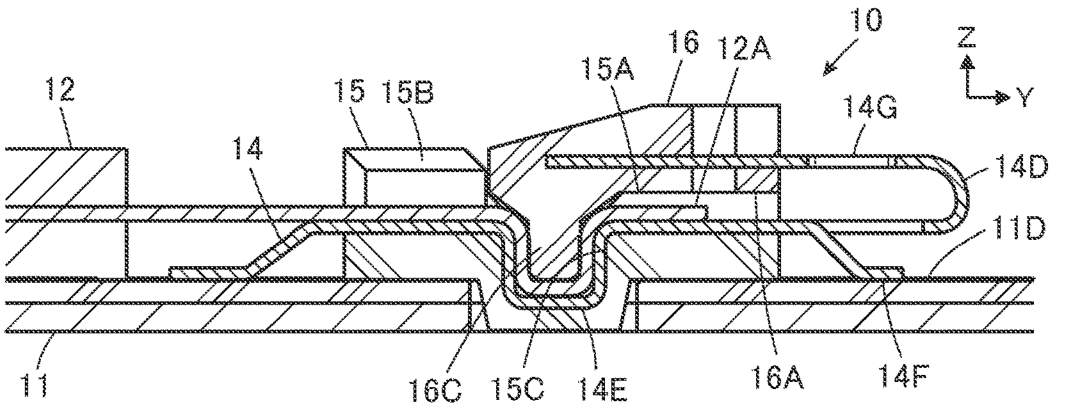
FIG. 16 is a partial, cross-sectional side view showing the connector according to Embodiment 1 after being assembled.

Next, the second insulator 16 is pressed against the first insulator 15 in the −Z direction and thereby fitted to the first insulator 15 as shown in FIG. 16. At this time, the second flat surface 16A of the second insulator 16 makes contact with the first flat surface 15A of the first insulator 15, and a middle portion of the conductor portion 12A inserted in the electric wire insertion groove 15B of the first insulator 15 is pushed into the recessed bent portion 14E of the contact 14 accommodated in the corresponding recess portion 15C of the first insulator 15 by the protrusion portion 16C of the second insulator 16.

Thus, the assembling operation of the connector 10 is completed.

In the connector 10 thus assembled, the conductor portion 12A of the coated electric wire 12 and the recessed bent portion 14E of the contact 14 make contact with each other in the Y direction with a predetermined contact pressure between the inner lateral surface of the recess portion 15C and the outer lateral surface of the protrusion portion 16C, so that the conductor portion 12A is electrically connected to the recessed bent portion 14E of the contact 14. In addition, since the connection portion 14F of the contact 14 is connected to the corresponding conductive portion 11D of the substrate 11, the conductor portion 12A of the coated electric wire 12 is electrically connected to the conductive portion 11D of the substrate 11 via the contact 14.

Figure 17:
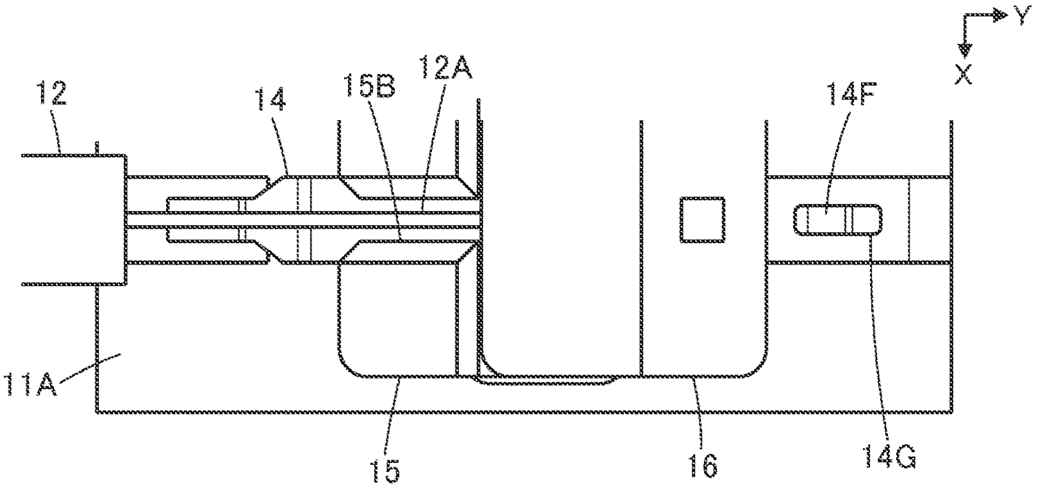
FIG. 17 is a partial plan view showing the connector according to Embodiment 1 after being assembled.

It should be noted that the conductor portion 12A of the coated electric wire 12 is pushed into the recessed bent portion 14E of the contact 14 and thereby bent along the inner surface of the recessed bent portion 14E; accordingly, the +Y directional end of the conductor portion 12A is retracted in the −Y direction and accommodated within the electric wire insertion groove 15B of the first insulator 15. Thus, in the state where the second insulator 16 is fitted with the first insulator 15, an operator cannot visually recognize the +Y directional end of the conductor portion 12A even when looking in the inspection hole 14G of the contact 14 from the +Z direction, as shown in FIG. 17. That is, the operator can confirm that the conductor portions 12A have been properly pushed in the recessed bent portions 14E of the contacts 14 and electrically connected to the contacts 14 based on the fact that the +Y directional ends of the conductor portions 12A are not seen through the inspection holes 14G of the contacts 14.

Figure 18:
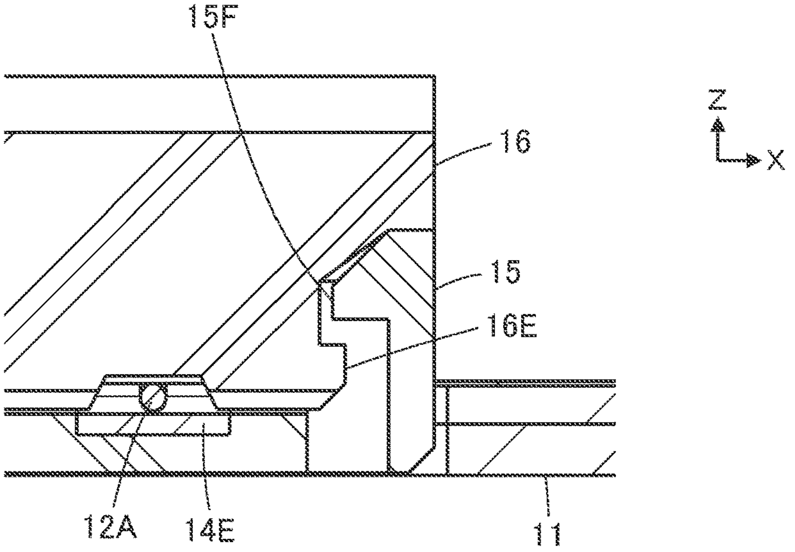
FIG. 18 is a partial, cross-sectional front view showing the connector according to Embodiment 1 after being assembled.

In addition, as shown in FIG. 18, a locking portion 15F projecting toward the middle of the first insulator 15 in the X direction is formed at each of the +X directional end and the −X directional end of the first insulator 15, and likewise, a locked portion 16E corresponding to the locking portion 15F of the first insulator 15 is formed at each of the +X directional end and the −X directional end of the second insulator 16. The locking portions 15F and the locked portions 16E interfere with each other, thereby maintaining the fitting state between the first insulator 15 and the second insulator 16.

The recessed bent portion 14E of the contact 14 has a sufficient length in the Z direction such that the bottom of the recessed bent portion 14E is situated on the −Z direction side with respect to the mounting portion 14A and the connection portion 14F, and owing to this configuration, the contact area can be ensured between the inner lateral surface of the recessed bent portion 14E and the conductor portion 12A that make contact in the Y direction, thus making it possible to electrically connect the conductor portion 12A to the contact 14 with high reliability.

Furthermore, as shown in FIG. 14, the bottom of the recessed bent portion 14E of the contact 14 is disposed inside the projection portion 15E of the first insulator 15, and the projection portion 15E is inserted in the depression 11C of the substrate 11; therefore, the connector 10 with a small thickness can be obtained despite the recessed bent portion 14E having a sufficient length in the Z direction.

Embodiment 2

While the second retained portions 14C formed at the +Y directional ends of the contacts 14 are embedded in the second insulator 16 in Embodiment 1 above, the invention is not limited thereto.

Figure 19:
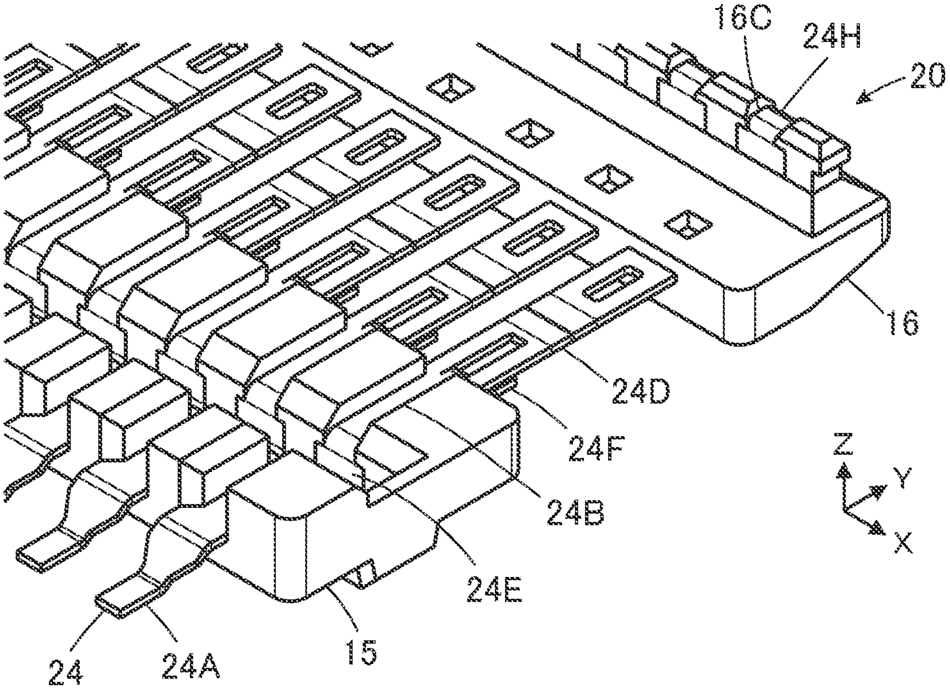
FIG. 19 is a partial perspective view showing a connector according to Embodiment 2 with a first insulator and a second insulator being developed.

FIG. 19 shows a connector 20 according to Embodiment 2. The connector 20 is configured to use a contact 24 in place of the contact 14 in the connector 10 of Embodiment 1. Specifically, the first insulator 15 and the second insulator 16 are joined together by a plurality of contacts 24 with distance.

The contact 24 is formed from a band shaped metal sheet having conductivity as with the contact 14 shown in FIGS. 7 and 8 and includes a mounting portion 24A disposed at the −Y directional end of the contact 24, a first retained portion 24B situated on the +Y direction side of the mounting portion 24A to be adjacent to the mounting portion 24A and retained by the first insulator 15, and a joint portion 24D situated on the +Y direction side of the first retained portion 24B to be adjacent to the first retained portion 24B and exposed. In addition, a recessed bent portion 24E is formed at an intermediate portion of the first retained portion 24B, and a connection portion 24F is formed at an intermediate portion of the joint portion 24D. The mounting portion 24A, the first retained portion 24B, the joint portion 24D, the recessed bent portion 24E, and the connection portion 24F have the same structures as those of the mounting portion 14A, the first retained portion 14B, the joint portion 14D, the recessed bent portion 14E, and the connection portion 14F of the contact 14 in the connector 10 of Embodiment 1.

Figure 20:
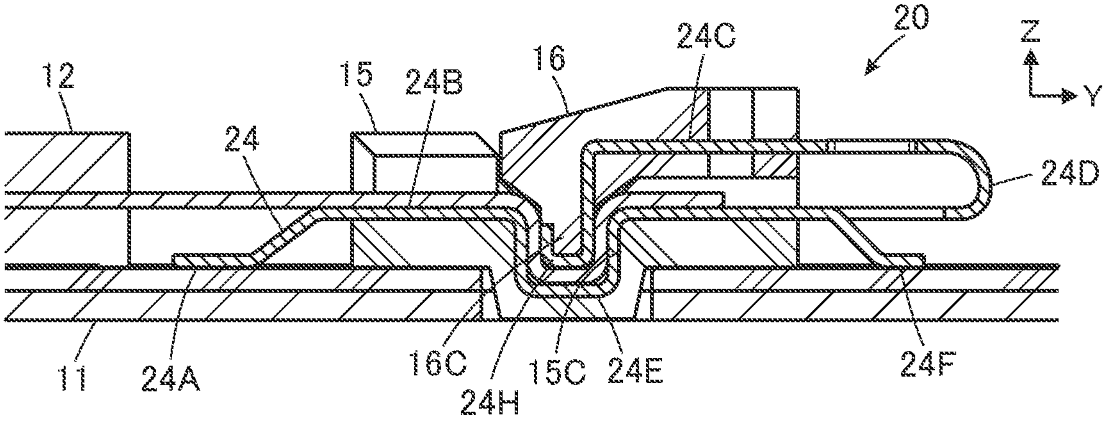
FIG. 20 is a partial, cross-sectional side view showing the connector according to Embodiment 2 after being assembled.
Figure 21:
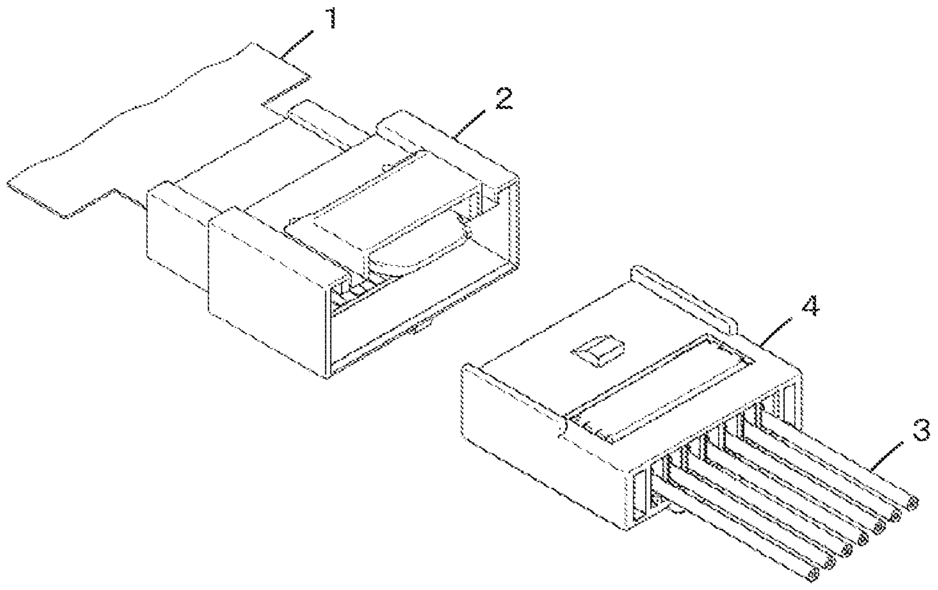
FIG. 21 PRIOR ART
FIG. 21 is a perspective view showing a conventional connector.

As shown in FIG. 20, the contact 24 further includes a second retained portion 24C joined to the joint portion 24D and retained by the second insulator 16, and the second retained portion 24C includes a protruding bent portion 24H extending along the outer surface of the protrusion portion 16C of the second insulator 16 and exposed.

Accordingly, when the second insulator 16 is fitted to the first insulator 15 to assemble the connector 20, a middle portion of the conductor portion 12A inserted in the electric wire insertion groove 15B of the first insulator 15 is pushed into the recessed bent portion 24E of the contact 24 accommodated in the recess portion 15C of the first insulator 15 by the protrusion portion 16C of the second insulator 16 on which the protruding bent portion 24H of the contact 24 is exposed. The conductor portion 12A of the coated electric wire 12 is sandwiched between the recessed bent portion 24E and the protruding bent portion 24H of the contact 24 to make contact with both the recessed bent portion 24E and the protruding bent portion 24H with a predetermined contact pressure. This improves the reliability of electric connection between the conductor portion 12A and the contact 24, thus increasing the reliability of connection of the coated electric wires 12.

While the inner lateral surface of the recessed bent portion 14E, 24E of the contact 14, 24 makes contact with the conductor portion 12A of the coated electric wire 12 with a predetermined contact pressure in the Y direction in Embodiments 1 and 2 above, the recessed bent portion 14E, 24E may have a spring property that presses the conductor portion 12A in the Y direction.

While the connector 10, 20 is formed by insert molding in Embodiments 1 and 2, the connector 10, 20 may be formed by, for instance, press-fitting the contacts 14, 24 such that the contacts 14, 24 are retained by both the first insulator 15 and the second insulator 16.

In Embodiments 1 and 2, the substrate 11 is constituted of a sheet type conductive member, and either a flexible substrate or a rigid substrate may be used as the substrate 11. Furthermore, the substrate 11 is not limited to a sheet type conductive member as long as it has the connector mounting region 11A used for mounting the connector 10, 20.

While the depression 11C of the substrate 11 is formed from a through-hole penetrating the substrate 11 in the Z direction in Embodiments 1 and 2, the depression 11C may be constituted of a recess formed at the surface of the substrate 11 on the +Z direction side without penetrating the substrate 11 when the substrate 11 has a sufficient thickness.

While the connector 10 of Embodiment 1 and the connector 20 of Embodiment 2 are configured such that the plurality of coated electric wires 12 are connected to the substrate 11, the invention is not limited thereto, and a connector may be configured such that a single coated electric wire 12 is connected to the substrate 11 in the same manner.

While the coated electric wire 12 is used as an electric wire connected to the substrate 11, an electric wire constituted only of the conductor portion 12A whose outer periphery is not covered with the insulating coating portion 12B may be connected to the substrate 11.

What is claimed is:

1. A connector connecting a conductor portion of an electric wire to a conductive portion exposed on a surface of a substrate, the connector comprising:
- a first insulator disposed on the surface of the substrate and having a recess portion;
- a second insulator disposed to be able to be fitted to the first insulator and having a protrusion portion corresponding to the recess portion; and
- a contact having conductivity and retained by both the first insulator and the second insulator,
- the contact including:
  - a mounting portion situated at one end of the contact and mounted on the substrate;
  - a first retained portion situated to be adjacent to the mounting portion and retained by the first insulator;
  - a second retained portion situated at the other end of the contact and retained by the second insulator;
  - a joint portion joining together the first retained portion and the second retained portion and being deformable; and
  - a connection portion electrically connected to the conductive portion of the substrate,
- wherein the first retained portion includes a recessed bent portion that is accommodated in the recess portion and extends along an inner surface of the recess portion,
- the first insulator and the second insulator are fitted to each other such that the conductor portion of the electric wire is sandwiched between the recessed bent portion of the contact and the protrusion portion of the second insulator, and
- the conductor portion of the electric wire makes contact with the recessed bent portion between the recess portion and the protrusion portion, whereby the conductor portion of the electric wire is electrically connected to the conductive portion of the substrate via the contact.

2. The connector according to claim 1,
wherein the conductor portion of the electric wire and the recessed bent portion of the contact make contact with each other with a predetermined contact pressure between an inner lateral surface of the recess portion and an outer lateral surface of the protrusion portion.

3. The connector according to claim 1,
wherein the joint portion of the contact is curved in a U-shape in a fitting state where the first insulator is fitted with the second insulator.

4. The connector according to claim 3,
wherein the joint portion has an inspection hole that penetrates the contact in a thickness direction of the contact and allows visual check of a tip of the conductor portion of the electric wire.

5. The connector according to claim 1,
wherein the first insulator includes a projection portion projecting toward the surface of the substrate,
a depression is formed at the surface of the substrate, and
the first insulator is disposed on the surface of the substrate with the projection portion being accommodated in the depression.

6. The connector according to claim 1,
wherein the second retained portion of the contact includes a protruding bent portion extending along an outer surface of the protrusion portion, and
the conductor portion of the electric wire is sandwiched between the recessed bent portion and the protruding bent portion of the contact and makes contact with both the recessed bent portion and the protruding bent portion.

7. The connector according to claim 1,
wherein the connection portion is disposed in the joint portion.

8. The connector according to claim 1,
wherein the contact is formed in the first insulator and the second insulator by insert molding.

9. The connector according to claim 1, comprising a plurality of the contacts aligned in a predetermined alignment direction and each retained by both the first insulator and the second insulator,
wherein the conductor portions of a plurality of the electric wires are electrically connected to a plurality of the conductive portions of the substrate via the plurality of the contacts.

10. The connector according to claim 9, comprising a lock mechanism used to maintain a fitting state between the first insulator and the second insulator.

11. The connector according to claim 10, wherein the lock mechanism is composed of a locking portion disposed in the first insulator and a locked portion disposed in the second insulator.

* * * * *